US011300965B2

(12) United States Patent
Feinson et al.

(10) Patent No.: US 11,300,965 B2
(45) Date of Patent: Apr. 12, 2022

(54) METHODS AND SYSTEMS FOR NAVIGATING AUTONOMOUS AND SEMI-AUTONOMOUS VEHICLES

(71) Applicant: EmergeX, LLC, Cumberland, MD (US)

(72) Inventors: Roy Feinson, Washington, DC (US); Ari Mikhael Katz, Potomac, MD (US)

(73) Assignee: EmergeX, LLC, Cumberland, MD (US)

( * ) Notice: Subject to any disclaimer, the term of this patent is extended or adjusted under 35 U.S.C. 154(b) by 384 days.

(21) Appl. No.: 16/584,566

(22) Filed: Sep. 26, 2019

(65) Prior Publication Data

US 2020/0103909 A1 Apr. 2, 2020

Related U.S. Application Data

(60) Provisional application No. 62/739,561, filed on Oct. 1, 2018.

(51) Int. Cl.
| | | |
|---|---|---|
| *G06N 3/04* | (2006.01) | |
| *G06N 3/08* | (2006.01) | |
| *G05D 1/02* | (2020.01) | |
| *G06K 9/62* | (2022.01) | |
| *G05D 1/00* | (2006.01) | |

(52) U.S. Cl.
CPC ......... *G05D 1/0214* (2013.01); *G05D 1/0088* (2013.01); *G05D 1/0221* (2013.01); *G05D 1/0246* (2013.01); *G06K 9/6256* (2013.01); *G06N 3/04* (2013.01); *G06N 3/08* (2013.01); *G05D 2201/0213* (2013.01)

(58) Field of Classification Search
CPC .. G05D 1/0214; G05D 1/0088; G05D 1/0221; G05D 1/0246; G05D 2201/0213; G06K 9/6256; G06N 3/04; G06N 3/08
See application file for complete search history.

(56) References Cited

U.S. PATENT DOCUMENTS

| | | |
|---|---|---|
| 8,965,104 B1 | 2/2015 | Hickman et al. |
| 2017/0053167 A1 | 2/2017 | Ren et al. |
| 2018/0012082 A1 | 1/2018 | Satazoda et al. |
| 2018/0136332 A1 | 5/2018 | Barfield, Jr. et al. |
| 2018/0150713 A1 | 5/2018 | Farooqi et al. |

OTHER PUBLICATIONS

International Search Report and Written Opinion issued in corresponding International Application No. PCT/US2019/053169 dated Jun. 29, 2020 (9 pages).
Fridman, et al., "Arguing Machines: Human Supervision of Black Box AI Systems that Make Life-Critical Decisions," Massachusetts Institute of Technology (MIT), Sep. 24, 2019 (11 pages).

*Primary Examiner* — Mathew Franklin Gordon
(74) *Attorney, Agent, or Firm* — Perkins Coie LLP

(57) ABSTRACT

Methods and systems are disclosed for an improved control system in autonomous and semi-autonomous vehicles. More specifically, the methods and systems relate to powering control systems of autonomous and semi-autonomous vehicles through the use of computer vision based on delta images (i.e., delta-vision).

21 Claims, 10 Drawing Sheets

METHODS AND SYSTEMS FOR NAVIGATING AUTONOMOUS AND SEMI-AUTONOMOUS VEHICLES

CROSS-REFERENCE TO RELATED APPLICATION

This application claims priority to U.S. Patent App. No. 62/739,561, filed Oct. 1, 2018, which is hereby incorporated by reference in its entirety.

FIELD OF THE INVENTION

The invention relates to autonomous and semi-autonomous vehicle control systems.

BACKGROUND

Interest in autonomous and semi-autonomous vehicles has expanded exponentially over the past decade. Despite the interest, control systems for these vehicles remains a persistent hurdle. Both public perception and public safety demand that control systems are near perfect, even if their safety record is far superior to their manually operated counterparts. The difficulty in obtaining near perfect safety in autonomous and semi-autonomous vehicles results from the fact that numerous and unforeseen obstacles and event may occur while these vehicles are in operation. Moreover, these vehicles normally operate as high speeds and/or encounter other vehicles and/or obstacles operating at high speeds, and while they may be programmed to operate in a scheduled, predictable manner, other vehicles and obstacles may not. Therefore, in order for autonomous and semi-autonomous vehicles to maintain near perfect safety, they must often account for these vehicles and obstacles as well.

SUMMARY

Methods and systems are disclosed herein to address the problems discussed above. In particular methods and systems are disclosed herein for an improved control system in autonomous and semi-autonomous vehicles. The benefits of the control system are obtained through improvements to computer vision techniques used in autonomous and semi-autonomous vehicles. More specifically, the methods and systems relate to powering control systems of autonomous and semi-autonomous vehicles through the use of computer vision based on delta images (i.e., delta-vision).

Conventional control systems for autonomous and semi-autonomous vehicles rely on a plurality of sensors and sensor types. In many cases, redundant sensors ensure safety if one sensor and/or sensor type fails or operates suboptimally in a given scenario. There is however a limit to the number of sensors and the types of information that can be used to power the control systems of autonomous and semi-autonomous vehicles because in addition to the cost associated with equipping numerous sensors to autonomous and semi-autonomous vehicles, there is also a limit to the energy available to power numerous sensors (particularly in hybrid or electronic autonomous and semi-autonomous vehicles). Furthermore, even when cost and energy consumption is not a concern, numerous sensors of different types, each feeding information to the control system of autonomous and semi-autonomous vehicles, requires massive computer processing power to interpret and respond in a real-time manner, particularly when the autonomous and semi-autonomous vehicles are moving a high speeds and/or obstacles appear seemingly instantaneously.

Conventional control systems for autonomous and semi-autonomous vehicles do not incorporate delta imaging into their computer vision control schemes because delta imaging is traditionally limited to providing data on moving objects. However, as described below, this disclosure provides improvements to delta imaging for use in control systems in control systems for autonomous and semi-autonomous vehicles that expands the use of delta imaging beyond detecting moving objects and limits the processing power required for control systems in autonomous and semi-autonomous vehicles to use delta imaging.

In one aspect, methods and systems are disclosed for identifying objects while operating autonomous or semi-autonomous vehicles. For example, the system may receive a delta image of a first vehicular scenario. The system may then identify an object in the delta image based on the delta image. For example, the system may generate a pixel array based on the delta image, input the pixel array into a neural network that has been trained to identify the object, and receive an output from the neural network identifying the object in the pixel array. The control system may then use that identification to initiate a control operation for the autonomous or semi-autonomous vehicle. The control operation may include any operation that directly, or indirectly, controls the autonomous or semi-autonomous vehicle. For example, the control operation may include initiating a given state of the vehicle (e.g., an emergency procedure in which the vehicle automatically selects a route. The control operation may include an operation that directly controls the vehicle such as selecting a direction or route to take. The control operation may also include operations that indirectly control the vehicle such as an operation that identifies a distance to, or a size of, an object and/or maps the terrain of the vehicle, thereby assisting with the navigation of the vehicle.

In order to expand the use of delta imaging in autonomous or semi-autonomous vehicle beyond detecting movement of objects, the system may train an artificial neural network to identify objects themselves based on delta images. For example, as opposed to detecting simply that an object has moved, the system identifies the type of object (e.g., person, vehicle, sign, etc.) as well. To generate training data for the artificial neural network, the system may store an image of the object, rotate the image of the object, and store a rotated image of the object. The system may then generate a test delta image based on the image and the rotated image, label test delta image with the object, and train the neural network based on the labeled test delta image with the object. For example, by generating training data in this manner, a plethora of training data may be generated for the neural network. Furthermore, in addition to identifying the object, the system may determine the speed, direction, and acceleration on an object based on the analysis of the delta edge thickness. For example, a thicker delta edge indicates a faster speed. An increasing thickness of delta edges indicates an acceleration. Likewise, a thinner delta edge indicates an object is further away. This information, which may be obtained through selecting one or more stored delta images of a scenario, increases the use of the delta imaging in autonomous or semi-autonomous vehicles to include object identification, determining characteristics of the object, and initiating the control operations discussed above.

By detecting objects using delta imaging, autonomous or semi-autonomous vehicles can harness camera equipment already used for video imaging applications in vehicles, but at a lower processing power and power consumption cost over conventional computer vision techniques. This processing power and power consumption cost can further be reduced by only processing select portions of a delta image through the neural network. For example, while conventional image processing processes the entire of an image, the system may select only a portion of the delta image that meets a particular pixel density. That is, as a large portion of the delta image has little or no delta information (e.g., representing objects that have not moved), this large portion may be excluded. For example, the system may generate a periphery image based on the delta image by removing chromatic information from the delta image and/or reducing the size of the delta image. The system may then determine a pixel density of a portion of the periphery image and compare the pixel density to a threshold density. In response to the pixel density equaling or exceeding the threshold (e.g., indicating that there is delta information in that portion), the system may input the portion into the neural network. By only processing a portion of the delta image with the delta information, the system saves overall processing power.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
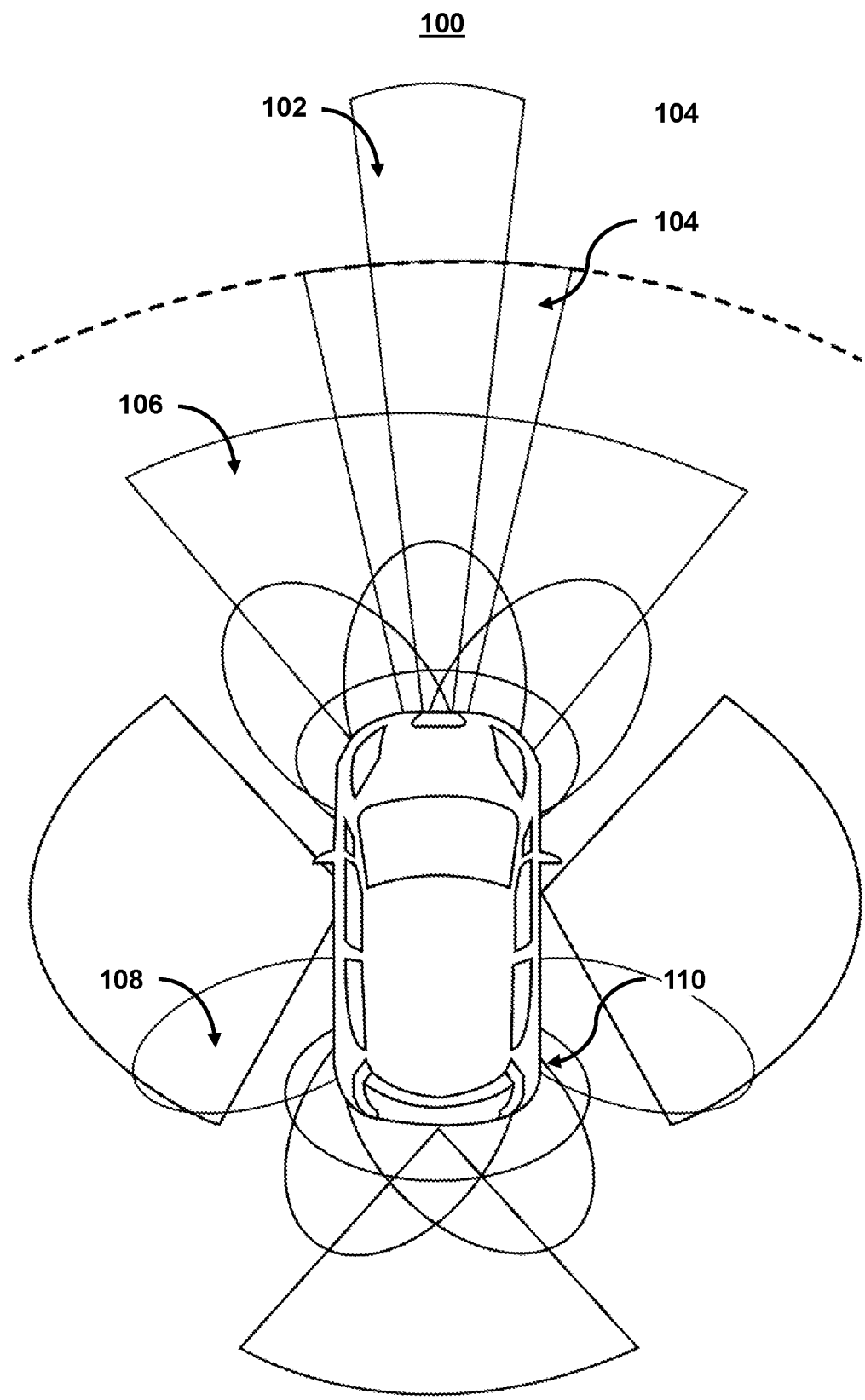
FIG. 1 shows a diagram of sensor ranges for an autonomous or semi-autonomous vehicle, in accordance with one or more embodiments.

FIG. 1 shows a diagram of sensor ranges for an autonomous or semi-autonomous vehicle, in accordance with one or more embodiments. It should be noted that while embodiments disclosed herein refer to autonomous or semi-autonomous vehicles, these embodiments may also apply to fully manual embodiments. Additionally, these embodiments may be applied to any vehicle used for transporting people or goods, providing services, including unmanned drones, as well as robotic, security, or other applications that require monitoring, navigating, and/or identifying objects within an environment. It should also be noted that the delta vision embodiments discussed herein may function as the sole or main monitoring, navigation, and/or sensor device for a given application, vehicle, etc. Alternatively, the delta vision embodiments discussed herein may compliment and/or work in concert with other monitoring, navigation, and/or sensor devices.

As shown in FIG. 1, autonomous or semi-autonomous vehicles may include a plurality of sensors and sensor types. Each sensor may also field view corresponding to the type of sensor. For example, as shown in FIG. 1, vehicle 100 include long-range radar 102, LIDAR 104, video camera 106, RADAR 108, and ultrasound 110. These sensors may work in concert to provide the control systems for an autonomous or semi-autonomous vehicle.

As shown in FIG. 1, video camera 106 may include substantially a 360 degree field of view. Furthermore, video cameras such as video camera 106 are, in many embodiments, the primary source of information for autonomous or semi-autonomous vehicle, and are the only sensors that can identify visual cues such as street signs, traffic signs, traffic signals, signal lamps, brake lights, etc. However, for cameras to function as the sole data source for an autonomous or semi-autonomous vehicle, the camera must transmit comprehensive, robust and timely information that may be used to calculate ego-motion, to determine a speed/angle of approaching objects, to identify objects, to build 3D models of terrain, and to predict object trajectories.

As described herein, an autonomous or semi-autonomous vehicle may use video camera 106 to determine this data through the use of delta imaging. That is, each delta image may deliver sufficient information to build an accurate 3D model of an environment, including high resolution data about ego motion, edge detection, speed and direction of moving objects. Furthermore, the system may do so quicker and more energy efficiently than full-frame video. Finally, vehicle 100 may generate the delta images using video camera 106 by preprocessing full-frame video prior to use.

In some embodiments, the delta image contains all the information needed for an autonomous or semi-autonomous vehicle to navigate a 3D space, and without referral to previous frames in memory. Furthermore, as the system analyzes delta image, which is stripped of unnecessary data, the system can process data and respond faster than system relying on multiple sensors and full-frame video. Thus, in some embodiments, a control system for an autonomous or semi-autonomous vehicle may consist of a sensor network comprising only video camera (e.g., video camera 106). For example, the system may include a pair of forward facing, rear, and side cameras to achieve an almost 360 degree view as shown in FIG. 1. The system may also include a physical camera stabilization system, a software-based stabilization system, and delta-vision software as described herein.

The amount of required stabilization is inversely proportional to the shutter speed and frame rate (which is advantageous for delta-vision), In some embodiments, the system may achieve stabilization by estimating motion, compensating for the motion, and image composition, in which camera motion is estimated through registration between frames. In some embodiments, the system may use a gyro-stabilized camera to correct for movements, and the system may optionally employ multi-axis gyro stabilization to enable high definition capture, despite vibrations and movements in the autonomous or semi-autonomous vehicle.

As discussed herein, in some embodiments, an autonomous or semi-autonomous vehicle may use delta-vision in order to initiate control operations. As referred to herein, "control operations" may include any operation that directs or affects the operation of the autonomous or semi-autonomous vehicle. Control operation may include initiating a given state of the vehicle (e.g., an emergency procedure in which the vehicle automatically selects a route. The control operation may include an operation that directly controls the vehicle such as selecting a direction or route to take. The control operation may also include operations that effects and/or indirectly controls the vehicle such as an operation that identifies a distance to, or a size of, an object and/or maps the terrain of the vehicle, thereby assisting with the navigation of the vehicle.

In some embodiments, delta-vision is based on the process of frame differencing, which the difference between two video frames is determined and a new frame (i.e., a delta frame) is created. The delta frame includes pixels that have changed between the two video frames. The system may identify objects in the delta frame (or delta image) based on the delta information in the delta image. For example, the system may identify objects based on the delta information and/or determine information about the objects (e.g., a distance, depth, direction of movement, and/or speed). Additionally, the system may compare one or more delta images to each other to determine an acceleration of an object. In some embodiments, the process includes generating a pixel array for each video frame and an arithmetic filtering process (e.g., subtracting one pixel value from another). It should be noted that throughout this disclosure a "delta image" should be understood to include a delta frame, and delta images may be based on a comparison of frames in a video or images (whether a part of a video or standalone). In some embodiments, a delta image may be produced through a process of frame-differencing. In some embodiments, delta images may also be based on other methods of discerning variances, such as, but not limited to static frames, or multi-dimensional tensors derived from spiking data streams acquired from event based sensors, data streams acquired from event based sensors which may indicate changes in a scene (e.g., whether or not based on the comparison of individual frames). For example, in some embodiments, delta images may be based on a difference between two images calculated by finding a difference between each pixel in each image and/or generating an image based on the result. In another example, delta images may be based on a detected variance in a detected photometric value whether or not the photometric value is associated with a prestored image and/or whether or not the detected photometric value is based directly or indirectly on a stored image. Notably, delta-vision requires substantially less processing power that edge detection and/or processes using a Canny filter. Moreover, canny filters highlight all edges (not simply moving objects), so noise contamination is an issue. This is particularly problematic in low-light conditions and night-vision applications.

For example, in some embodiments, delta vision as discussed herein may be used by a human operator, either while operating autonomous or semi-autonomous vehicles or for uses without autonomous or semi-autonomous vehicles. For example, a user using the delta vision techniques discussed herein to determine depths, identify moving objects, and/or determining information about objects (e.g., as discussed in FIGS. 5-10 below). For example, a human operator may receive a delta image through an electronic device (e.g., a computer, smartphone, etc.) and/or while wearing a virtual reality wearable device, an augmented reality wearable device, and/or night vision wearable device. These wearable devices may include headsets, glasses, and/or other wearable electronic device. The delta image may be overlaid on virtual reality images or overlaid on real world images (e.g., in an augmented reality arrangement). In some embodiments, the delta image or identified depths, objects, and/or information about the objects may appear on the device (e.g., in a user interface). The user interface may include additional information (e.g., distances, depths, etc.). Additionally or alternatively, delta information in a delta image may be overlaid (e.g., in a distinctive color) in order for users to better identify edges of objects, moving objects, etc.

Figure 2:
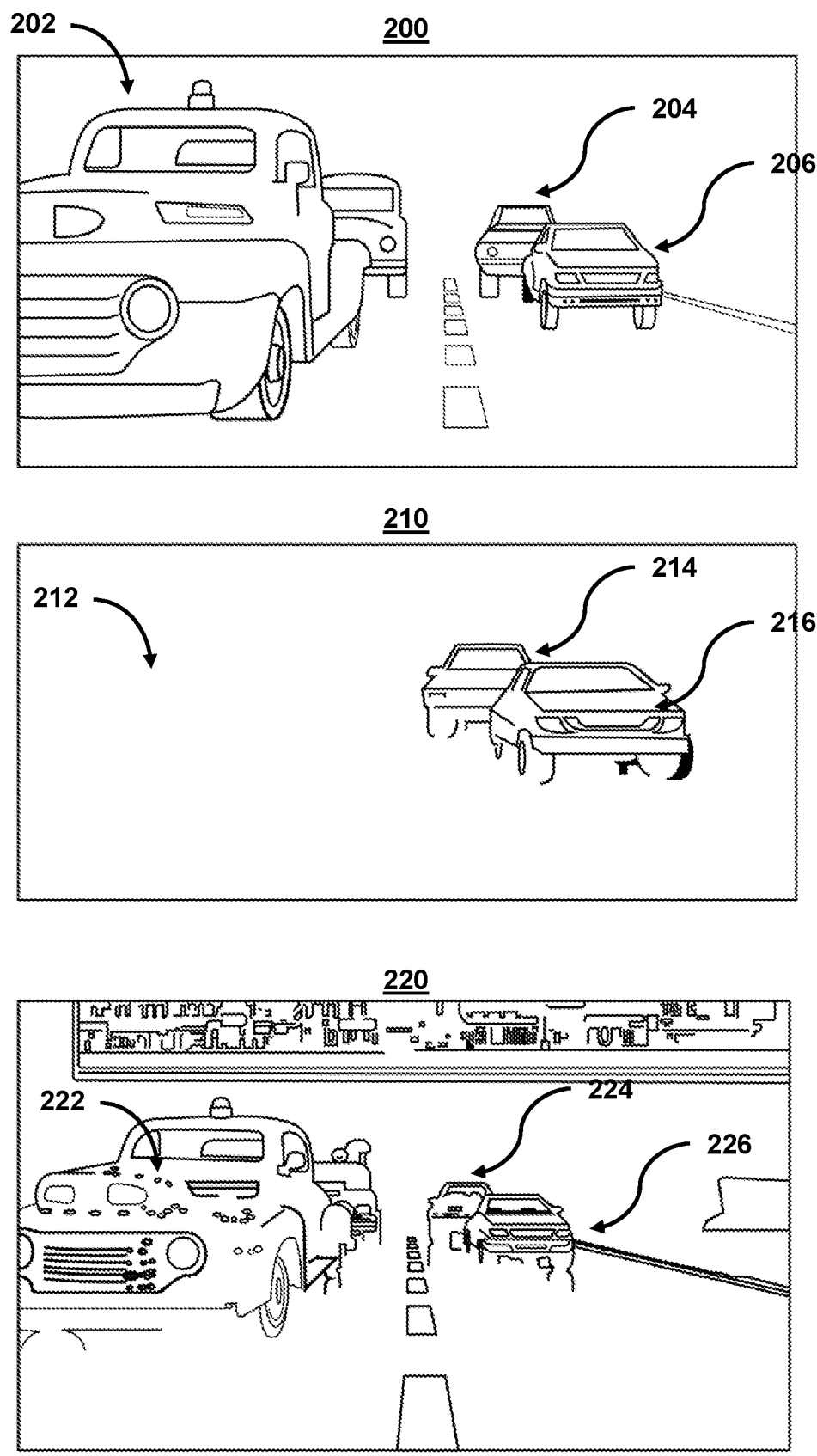
FIG. 2 shows a diagram of delta images used to identify objects in a vehicular scenario, in accordance with one or more embodiments.

FIG. 2 shows a diagram of delta images used to identify objects in a vehicular scenario, in accordance with one or more embodiments. FIG. 2 shows image 200, delta image 210, and canny filter image 220. Image 200 includes stationary object 202 and moving objects 204 and 206. For example, image 200 may represent a vehicular scenario encountered by an autonomous or semi-autonomous vehicle during operation. It should be noted that as referred to herein a "vehicular scenario" may include any scenario or situation in which an autonomous or semi-autonomous vehicle may encounter during operation. The scenario is not limited to a speed of the vehicle and/or a speed on and obstacle. Moreover, as referred to herein, an "obstacle" is meant to include any object that an autonomous or semi-autonomous vehicle may encounter during operation. This may include stationary or moving objects, and objects may include any material thing that can be seen or touched. For example, an object may include a person, a vehicle, a road sign, etc. An object may also include a visual cue (e.g., a traffic light changing from red to green).

In some embodiments, the system may first create a delta image of the vehicular scenario. For example, the system may first segment the foreground and/or moving objects from the background and/or non-moving objects by capturing a first image at a first time. The system may them obtain a second image at another time and subtract each value pixel for each pixel (e.g., position in the image) from the pixel value at a corresponding pixel (e.g., the same position) in the first image. The delta image would then only show an intensity for a pixel location, which has changed between the two frames. It should be noted that in some embodiments a change threshold may be implemented. For example, the system may determine a difference between the images' pixels values at a corresponding position and filter the values based on the threshold in order to remove noise. In some application, for example those involving faster movement, the system may use higher thresholds to reduce noise.

For example, in delta image 210, the system has generated delta edges for moving objects 214 and 216, but no delta edges for stationary object 212. For example, the autonomous or semi-autonomous vehicle that captured delta image 210 may itself be stationary (e.g., parked or waiting at a stop light); therefore, only moving objects 214 and 216 are detected. Alternatively, the system may set a threshold based on the speed of the autonomous or semi-autonomous vehicle; thus, despite the distance of stationary object 212 and the autonomous or semi-autonomous vehicle decreasing as the autonomous or semi-autonomous vehicle approaches stationary object 212, delta image 210 does not render stationary object 212. As only delta information on moving objects 214 and 216 is recorded, the amount of data (e.g., the amount of delta information) that the system processes is lower.

In some embodiments, the system may frame difference high-resolution frames (e.g., to create a delta image), and then the system may compress (using one or more filtering operations as opposed to compressing high-resolution frames and then frame differencing the frames. For example, conventional system may perform compression first to remove non-essential data and lower the amount of system needing to be processed. However, when compression is done first, edge detail may be lost.

Accordingly, the system and methods discussed herein may include a novel CODEC utilizing a frame differencing/compression method in which an uncompressed initial frame (e.g., a key frame) is frame-differenced with the second uncompressed frame. The system may then compress the frame differenced frame (e.g., a delta image). The system may then frame-difference the uncompressed second frame with a third uncompressed frame. The resulting video stream will therefore be highly compressed, but with less loss of edge detail.

Figure 6:
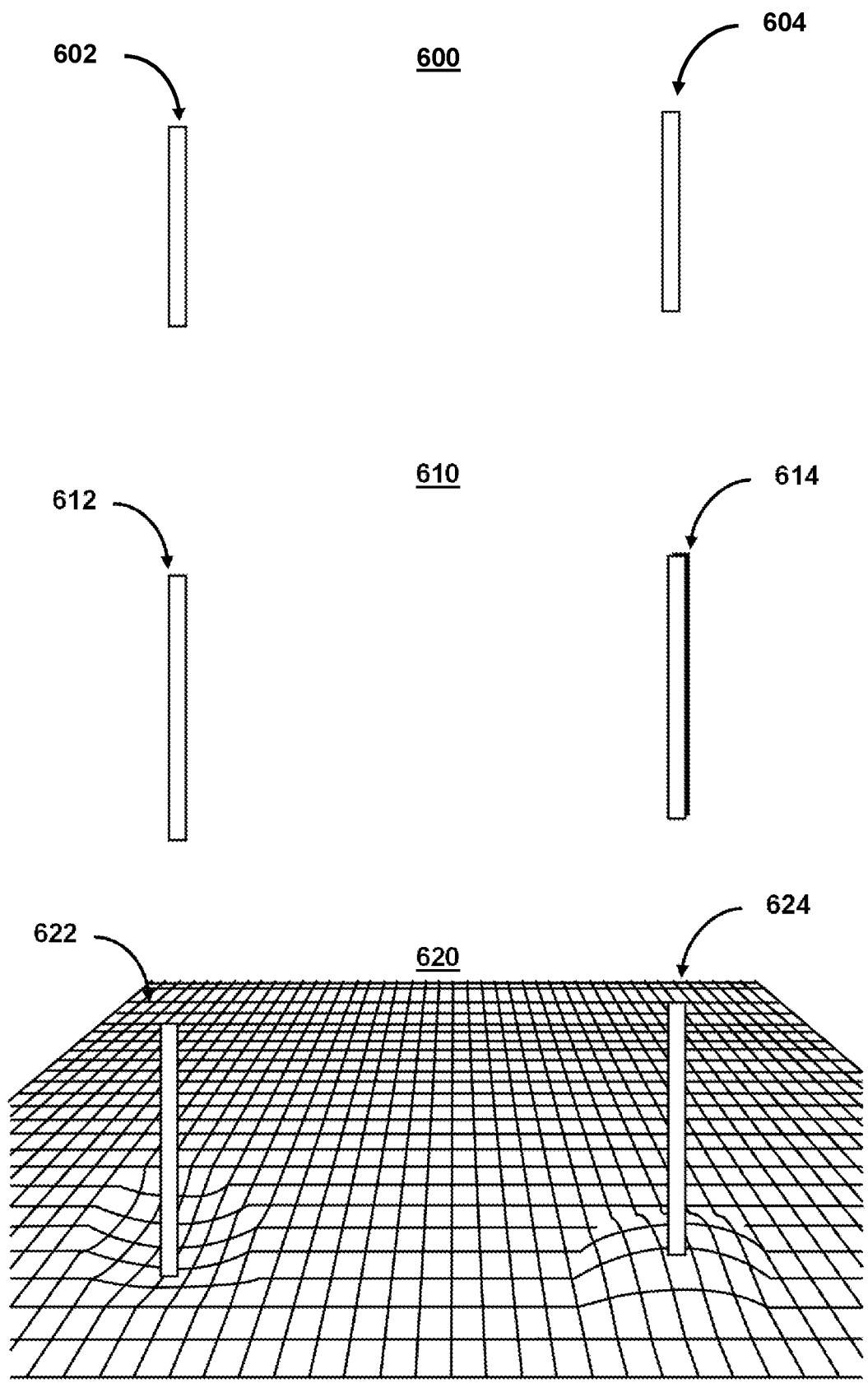
FIG. 6 shows an illustrative example of determining distances of an object based on delta images, in accordance with one or more embodiments.

In some embodiments, for example a night vision application of delta vision, delta image 210 may be overlaid (e.g., in a user interface of an electronic device) over image 200. The delta information for moving objects 214 and 216 may then be overlaid onto the images of moving objects 204 and 206. Furthermore, the delta information for moving objects 214 and 216 may be displayed in a distinctive color in order to highlight the objects. This is particularly beneficial in low light environments. Additionally or alternatively, other information such as an identification of moving objects 214 and 216, information about moving objects 214 and 216, and/or terrain mapping (e.g., as shown in FIG. 6 below) may also be included.

FIG. 2 also includes canny filter image 220. In contrast to image delta image 210, in canny filter image 220 stationary object 222 as well as moving objects 224 and 226 are recorded. Thus, the amount of information that needs to be processed by the system is increased. Additionally, an overlaid image (e.g., in a night vision application) would include additional noise (e.g., highlights of non-moving or unimportant objects).

Figure 3:
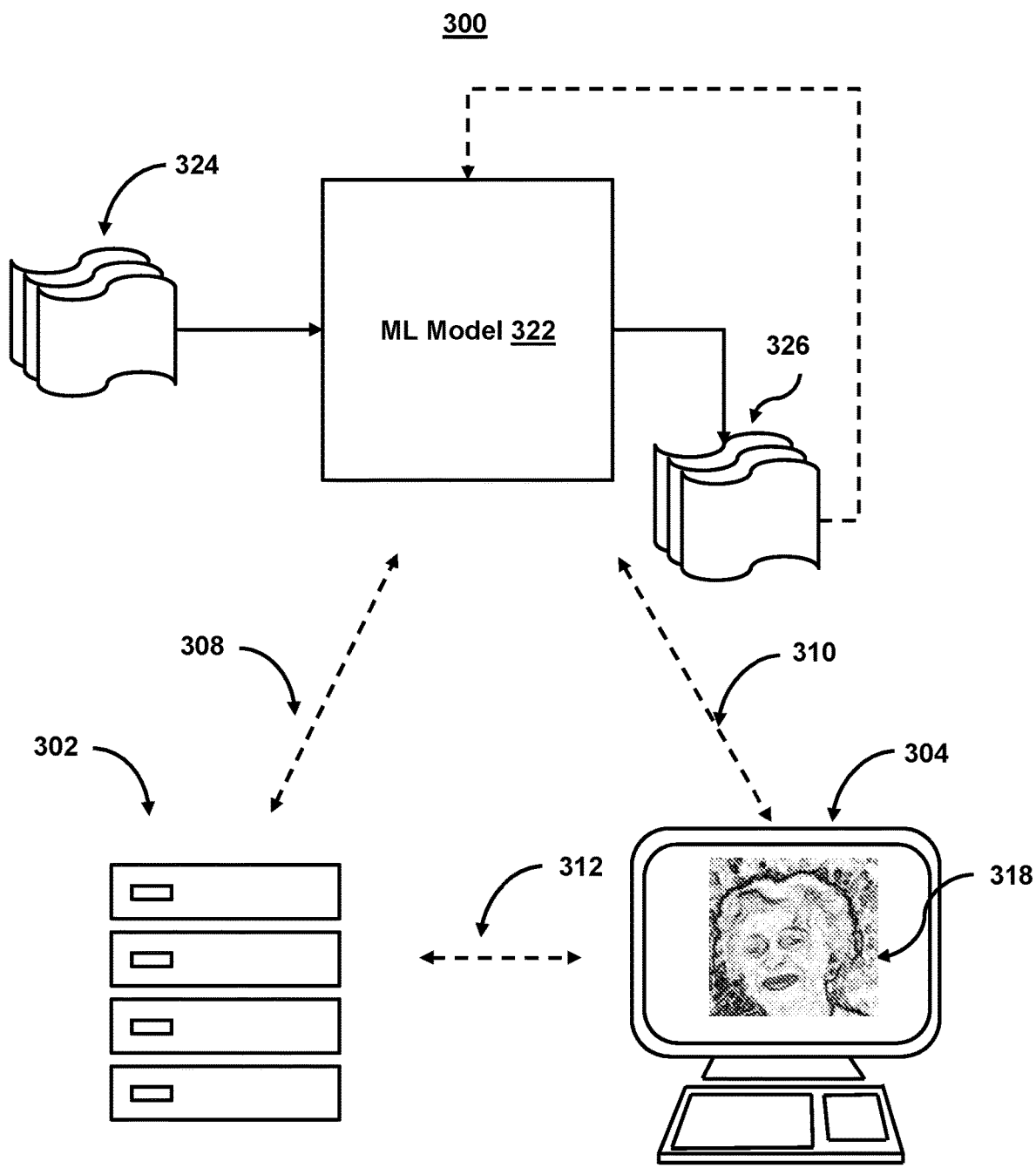
FIG. 3 shows a system featuring a machine learning model configured to identify objects in a vehicular scenario, in accordance with one or more embodiments.

FIG. 3 shows a computer system featuring a machine learning model configured to identifying objects while operating autonomous or semi-autonomous vehicles, in accordance with one or more embodiments. As shown in FIG. 3, system 300 may include client device 302, client device 304 or other components. Each of client devices 302 and 304 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 302 and 304 may include a desktop computer, a server, or other client device. Users may, for instance, utilize one or more client devices 302 and 304 to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of client device 302, those operations may, in some embodiments, be performed by components of client device 304. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 308, 310, and 312. Communication paths 308, 310, and 312 may include the Internet, a mobile phone network, a mobile voice or data network (e.g., a 4G or LTE network), a cable network, a public switched telephone network, or other types of communications network or combinations of communications networks. Communication paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 300 may use one or more prediction models to predict internal conditions based on external characteristics. For example, as shown in FIG. 3, system 300 may predict an object type using machine learning model 322. The determination may be output shown as output 318 on client device 304. The system may include one or more neural networks (e.g., as discussed in relation to FIG. 3) or other machine learning models.

As an example, with respect to FIG. 3, machine learning model 322 may take inputs 324 and provide outputs 326. The inputs may include multiple data sets such as a training data set and a test data set. The data sets may represent delta images (or image sets) of objects encountered while operating autonomous or semi-autonomous vehicles. In one use case, outputs 326 may be fed back to machine learning model 322 as input to train machine learning model 322 (e.g., alone or in conjunction with user indications of the accuracy of outputs 326, labels associated with the inputs, or with other reference feedback information). In another use case, machine learning model 322 may update its configurations (e.g., weights, biases, or other parameters) based on its assessment of its prediction (e.g., outputs 326) and reference feedback information (e.g., user indication of accuracy, reference labels, or other information). In another use case, where machine learning model 322 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 322 may be trained to generate better predictions.

Machine learning model 322 may be trained to objects in vehicular scenarios. For example, client device 302 or 304 may generate a delta image of an object (e.g., via an image capture device), generate a first pixel array based on a delta image of the object, and label the object (or first pixel array). For example, machine learning model 322 may have classifications for various objects that may be encounter in vehicular scenarios. Machine learning model 322 is then trained based on a first data set (e.g., data of known objects) to classify an unknown object.

The system may then receive a delta image of a second object (e.g., an object encounter while an autonomous vehicle is in operation). Client device 302 or 304 may generate a second pixel array based on a delta image of the second object and input the second pixel array into machine learning model 322. The system may then receive an output from machine learning model 322 indicating that the second object is the same as the first. For example, the system may input a second delta image into machine learning model 322. Machine learning model 322 may then classify the objects in the second delta image. For example, a person, road sign, or vehicle may be a first classification of machine learning model 322, and the system may generate an output from machine learning model 322 that the second object is the same based on matching the second pixel array to the first classification.

In some embodiments, system 300 is further configured to perform one or operations based on the output. For example, the system may navigate a vehicle, detect the direction, distance, or speed of objects, and/or assist in mapping routes and terrain.

Figure 4:
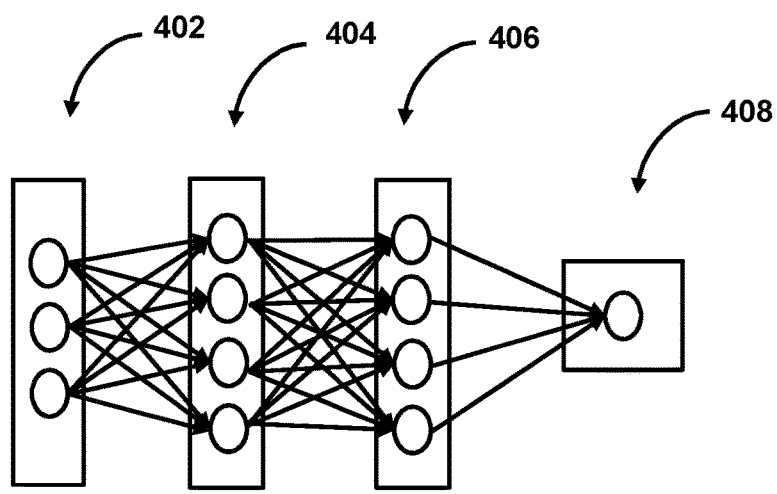
FIG. 4 shows graphical representations of artificial neural network models for identifying objects in a vehicular scenario, in accordance with one or more embodiments.
Figure 4:
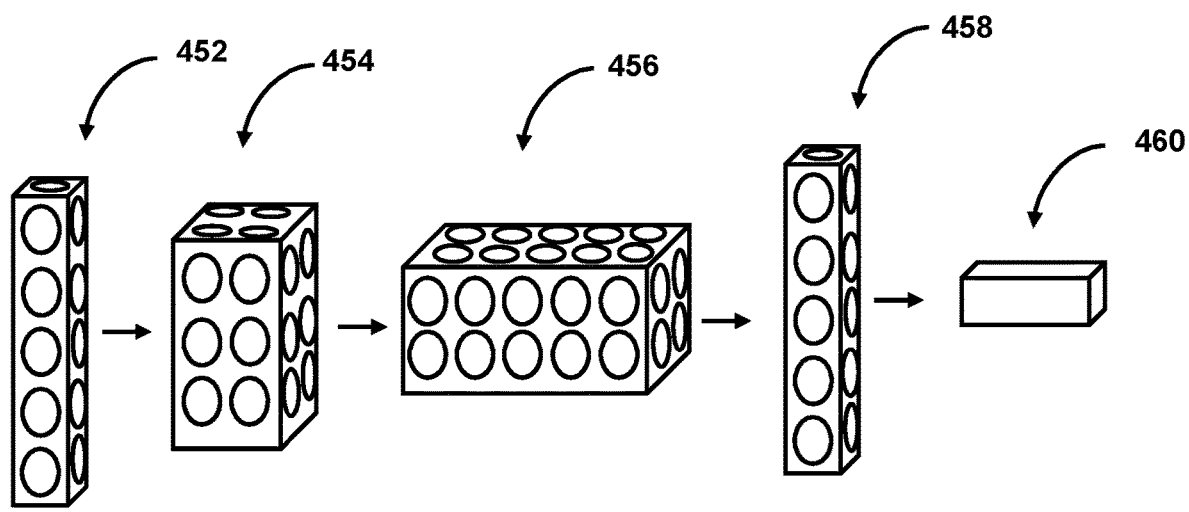

FIG. 4 shows a graphical representations of artificial neural network models for identifying objects while operating autonomous or semi-autonomous vehicles, in accordance with one or more embodiments. Model 400 illustrates an artificial neural network. Model 400 includes input layer 402. Delta image may be entered into model 400 at this level. Model 400 also includes one or more hidden layers (e.g., hidden layer 404 and hidden layer 406). Model 400 may be based on a large collection of neural units (or artificial neurons). Model 400 loosely mimics the manner in which a biological brain works (e.g., via large clusters of biological neurons connected by axons). Each neural unit of a model 400 may be connected with many other neural units of model 400. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 400 may be self-learning and trained, rather than explicitly programmed, and can perform significantly better in certain areas of problem solving, as compared to traditional computer programs. During training, output layer 408 may corresponds to a classification of model 400 (e.g., whether or not a given delta image corresponds to a particular object) and an input known to correspond to that classification may be input into input layer 402.

In some embodiments, model 400 may include multiple layers (e.g., where a signal path traverses from front layers to back layers). In some embodiments, back propagation techniques may be utilized by model 400 where forward stimulation is used to reset weights on the "front" neural units. In some embodiments, stimulation and inhibition for model 400 may be more free-flowing, with connections interacting in a more chaotic and complex fashion. Model 400 also includes output layer 408. During testing, output layer 408 may indicate whether or not a given input corresponds to a classification of model 400 (e.g., whether or not a given delta image corresponds to a particular object).

FIG. 4 also includes model 450, which is a convolutional neural network. The convolutional neural network is an artificial neural network that features one or more convolutional layers. Convolution layers extract features from an input image. Convolution preserves the relationship between pixels by learning image features using small squares of input data. For example, the relationship between the individual portions of a delta image. As shown in model 450, input layer 452 may proceed to convolution blocks 454, 456, and 458 before being output to convolutional output 460. In some embodiments, model 450 may itself serve as an input to model 400.

With respect to applications identifying objects while operating autonomous or semi-autonomous vehicles, model 450 may also be adjusted to improve performance. For example, model 450 may undergo weight pruning such that each weight is measure and unimportant weights are removed. Notably, the loss of this data does not affect overall accuracy as delta information contrast well with portions of data without delta information. Similarly, sparse convolutional neural networks, in particular submanifold sparse convolutional networks, also perform well in delta-vision applications. Maximum sparsity is obtained by exploiting both inter-channel and intra-channel redundancy, with a fine-tuning step that minimize the recognition loss caused by maximizing sparsity. It should also be noted that embodiments discuss herein may also be used with (other/any) deep learning, machine learning or differentiable programming architecture, including CNN-LSTMs, and spiking neural networks designed to work with event based sensor data streams.

Figure 5:
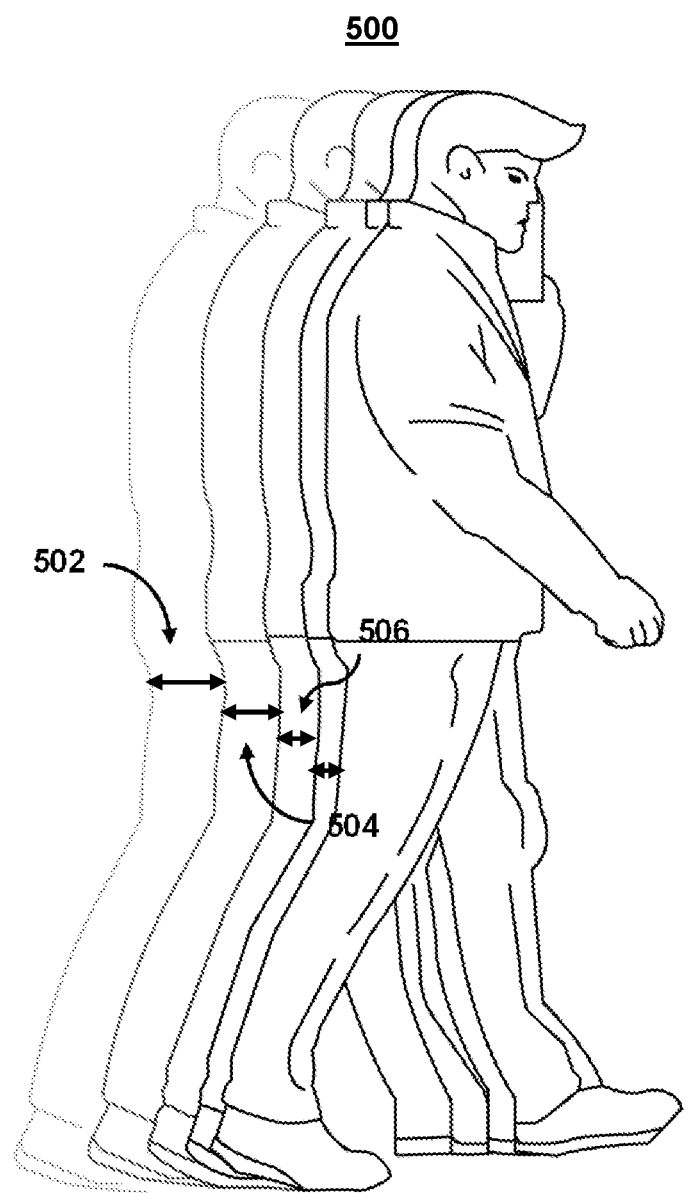
FIG. 5 shows an illustrative example of determining an acceleration in an object based on delta images, in accordance with one or more embodiments.

FIG. 5 shows an illustrative example of determining an acceleration (or deceleration) of an object based on delta images, in accordance with one or more embodiments. For example, FIG. 5 shows object 500 (e.g., a person walking in a vehicular scenario). Through the use of multiple delta images, the system may determine the direction and/or acceleration of the object. For example, the system has captured multiple delta images of object 500. One or more of these images may be "look back" images, which refer to previously stored images on an object. By comparing various delta images (e.g., delta images based on a current image and respective look back images) and the changes between these delta images, the system may determine the direction and/or acceleration of object 500.

FIG. 5 may represent a delta image of object 500 captured by one or more embodiments disclosed herein. For example, as discussed in relation to FIG. 7 below, the system may capture a delta image of object 500, and input the delta image (or a pixel array based on the delta image) into an artificial neural network that has been trained to identify objects based on delta images. Accordingly, the system may identify object 500 as a known object (e.g., a person).

For example, the thicknesses of the vertical delta-edges indicate object 500's motion between frames. By comparing the distance between delta edges created by using look back images, the system may determine a rate of deceleration (or acceleration). For example, by comparing the length of distance 502, 504, and 506, the system may determine that because these lengths are decreasing, object 500 is decelerating.

Likewise, by comparing two delta images, the system may determine a direction of object 500, and based on the direction and acceleration of object 500, the system may determine a likely future position of object 500.

In some embodiments, the system may use an unvarying sequence of look back images (Frame[n], Frame [n-1], Frame [n-2], etc.). Alternatively or additionally, the system may select a look back frame based on a delta image criterion. A delta image criterion may include a recommended number of look back images, a recommended temporal gap (or number of images) between look back images, or an assigned significance of look back images (e.g., look back images tagged for particular significance). This recommendation may be based on the identified object (e.g., objects associated with moving at a higher speed such as a vehicle may have a different look back image selected than those associated with moving at a lower speed such as a person) or may be based on a determined ego motion, a determined lighting, or a determined environmental factor. In some embodiments, the look back image may be selected based on an artificial neural network as described in FIG. 4, in which the training parameters include ego-motion, lighting, and environmental factors.

FIG. 6 shows an illustrative example of determining distances of an object based on delta images, in accordance with one or more embodiments. FIG. 6 includes image 600. Image 600 includes object 602 and object 604. Notably, in image 600 low visibility of other factors prevents additional data from being detected by an autonomous or semi-autonomous vehicle, and it is therefore difficult to determine the size and relative distance of object 602 and 604.

Delta image 610 illustrates a delta image capture by one or more embodiments disclosed herein. In delta image 610, object 612 and object 614 are identified by their respective delta edges. For example, as discussed in relation to FIG. 6 below, the system may capture a delta image (e.g., delta image 610) of object 612 or object 614, and input the delta image (or a pixel array based on the delta image) into an artificial neural network that has been trained to identify objects based on delta images. Accordingly, the system may identify object 612 and object 614 as known objects (e.g., telephone poles).

The system may determine the width of delta edges on object 612 and 614. Based on the width of the delta edges, the system may determine the distance from the autonomous or semi-autonomous vehicle to object 612 and object 614 as the width of delta edge is constant for all sizes and shapes of objects. Objects further away will appear with a smaller delta edge, while objects closer will appear with a larger delta edge. For example, frame differencing yields edges whose density (thickness) is proportional to the distance of an object and the ego-motion of the viewer. Alternatively, if the object itself is in motion, the system must subtract ego-motion. Thus, the varying thickness of the delta-edges allows the system to determine the distance to all objects in a vehicular scenario.

The system may then input the known object (e.g., a telephone pole) into a database listing a known size (or sizes) of the object. Based on the size of the object (e.g., as determined by referencing a database), and the distance to the object (e.g., as determined by the delta edges), the system may determine a terrain of the environment.

For example, as shown in image 620, the system has generated a wire overlay of the terrain based on the determined size and distance. In addition to the terrain-map, the system may generate a label showing the distance of each object (e.g., object 622 and object 624) that may be overlaid on a screen. Additionally or alternatively, as the distance to the objects are known, it is possible to compute their height and thickness and also optionally display this data on a screen (e.g., a night-vision screen). In some embodiments, generating a terrain map requires horizontal stabilization of the system. The system may maintain this stabilization by using an algorithm which can compensate for the angle of the view screen using data from a sensor such as a gyroscope. Furthermore, the system may dynamically update the terrain-map as additional delta information arrives.

In some embodiments, the system may identify objects (e.g., object 622 and object 624) during night vision application. For example, in a night vision or low light application, the system may receive a delta image of a night vision scenario (e.g., as shown in image 600). The system may then detect delta information in a delta image (e.g., delta image 610) of the night vision scenario. The system may then overlay the delta information on an image of the night vision scenario. For example, the system may generate an overlay that include additional information about objects in the night vision scenario (e.g., object 622 and object 624) such as an identification of the object and/or a distance to the object. Additionally or alternatively, the system may include a terrain may (e.g., as shown in image 620). The system may also modify a visual characteristic of the object, delta information, and/or information about the object in the overlaid image. For example, the system may display the terrain map and/or distance to object 622 in a distinctive color.

It should also be noted that in some embodiments, the system may further train an artificial neural network (e.g., as discussed above) to identify objects in night vision applications. In such embodiments, the system may train the artificial neural network based on delta images of objects as they appear in low light or night vision applications. In such embodiments, the system may input a delta image into a trained artificial neural network and receive an output comprising an identification of an object or information about the object based on the delta image.

Figure 7:
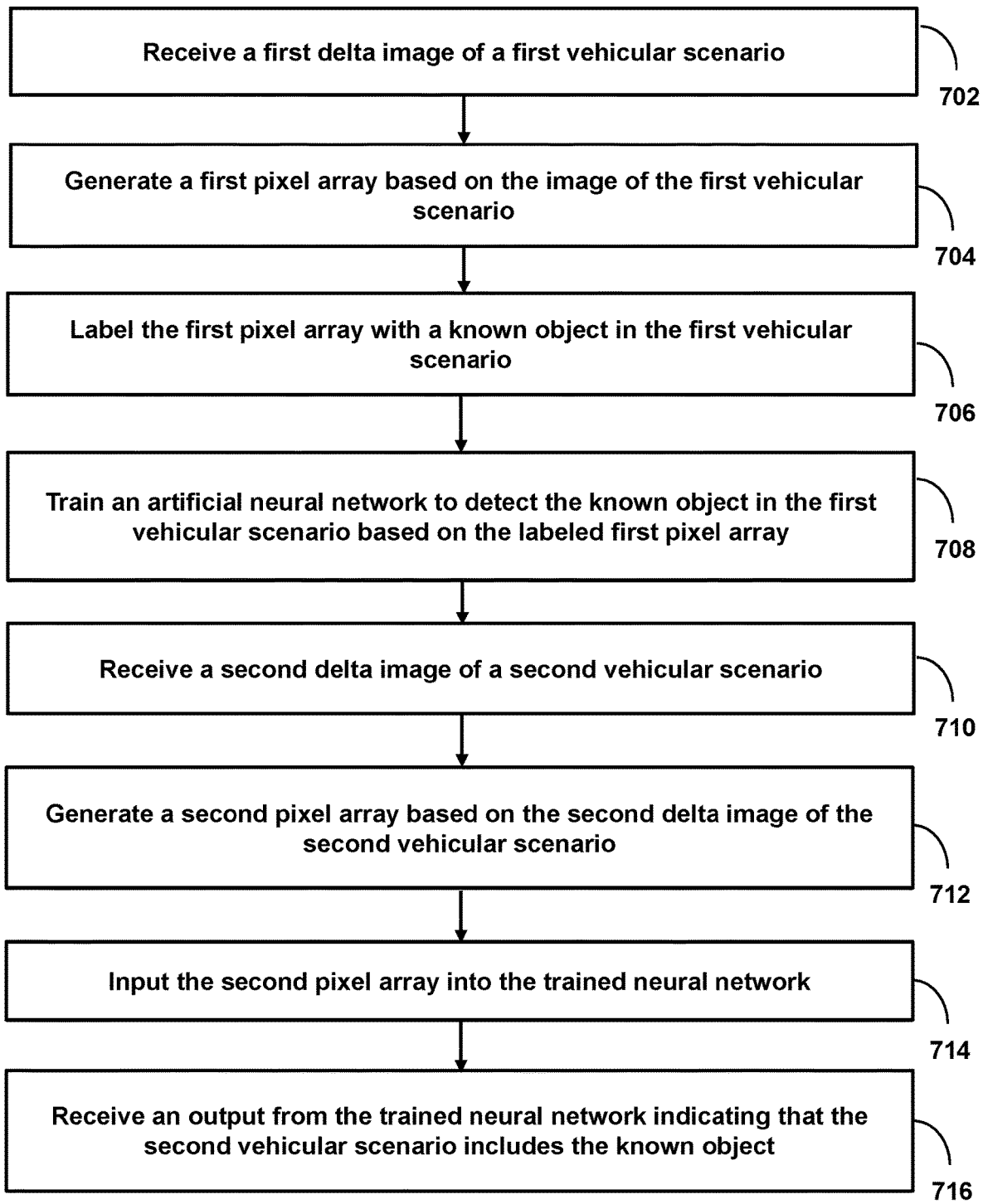
FIG. 7 shows a flowchart for training and identifying objects while operating autonomous or semi-autonomous vehicles based on an artificial neural network, in accordance with one or more embodiments.

FIG. 7 shows a flowchart for training and identifying objects while operating autonomous or semi-autonomous vehicles based on an artificial neural network, in accordance with one or more embodiments. Process 700 may be performed using the control circuitry of one or more components described in FIG. 3.

At step 702, process 700 receives (e.g., using the control circuitry of one or more components described in FIG. 3) a first delta image of a first vehicular scenario. For example, the system may receive a delta image created based on images of a known object (e.g., as described in FIG. 9 below). In some embodiments, the system may generate the first delta image based on an image and a rotated version of that image. For example, the system may populate of database of training images by capturing an image of an object. The system may then generate delta images for the object for use in training by rotating the previously captured image.

At step 704, process 700 generates (e.g., using the control circuitry of one or more components described in FIG. 3) a first pixel array based on the image of the first vehicular scenario. For example, in some embodiments, the system may generate pixel arrays to represent delta images. The pixel array may refer to computer data that describes the image (e.g., pixel by pixel). In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 706, process 700 labels (e.g., using the control circuitry of one or more components described in FIG. 3) the first pixel array with a known object in the first vehicular scenario. For example, in order to train the artificial neural network, the system may collect and label numerous objects that may be encounter in vehicular scenarios.

At step 708, process 700 trains (e.g., using the control circuitry of one or more components described in FIG. 3) an artificial neural network to detect the known object in the first vehicular scenario based on the labeled first pixel array. For example, as discussed in relation to FIG. 3, the artificial neural network may have classifications for different objects.

At step 710, process 700 receives (e.g., using the control circuitry of one or more components described in FIG. 3) a second delta image of a second vehicular scenario. For example, the system may capture a delta image of an object encounter while the autonomous or semi-autonomous vehicle is in operation. In some embodiments, process 700 may normalize the second array in order to account for bias in the system. In another example, the system may generate the second delta image based on the image and the rotated image (e.g., as in FIG. 9). In some embodiments, the system may generate the second delta image based on an image and a rotated version of that image. For example, in response to detecting that ego-motion is zero, the system may capture an image of an object and/or vehicular scenario. The system may then generate a delta image for the object by rotating the previously captured image and/or by rotating a camera used to capture images and capture a rotated image of the object and/or vehicular scenario. In another example, in response to failing to identify an object in a scenario, the system may capture an image of an object and/or vehicular scenario. The system may then generate a delta image for the object by rotating the previously captured image and/or by rotating a camera used to capture images and capture a rotated image of the object and/or vehicular scenario. In another example, in response to determining that the acceleration of a vehicle is exceeds or equals a given threshold, the system may capture an image of an object and/or vehicular scenario by rotating the previously captured image and/or by rotating a camera used to capture images and capture a rotated image of the object and/or vehicular scenario. The system may then generate a delta image based on an original image and the rotated image.

At step 712, process 700 generates (e.g., using the control circuitry of one or more components described in FIG. 3) a second pixel array based on the second delta image of the second vehicular scenario. In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 714, process 700 inputs (e.g., using the control circuitry of one or more components described in FIG. 3) the second pixel array into the trained neural network. For example, the trained neural network may identify the object and/or information about the object (e.g., distance depth, size etc.) based on the second pixel array.

At step 716, process 700 receives (e.g., using the control circuitry of one or more components described in FIG. 3) an output from the trained neural network indicating that the second vehicular scenario includes the known object. For example, the trained neural network may output the identification of the object and/or information about the object (e.g., distance depth, size etc.).

In some embodiments, the system may use the output to initiate a control operation. For example, the system may determine a dangerous condition based on the output (e.g., the output indicates a car approaching another car at a high speed). The system may then determine an area in the second delta image with little or no delta information (e.g., a safe area). The system may direct the autonomous or semi-autonomous vehicle to the area based the second delta image having no delta information in that area.

In some embodiments, to determine that an area has little or no delta information, the system may determine the pixel density of an area and/or one or more values (e.g., a chromatic value associated with the pixel) of one or more pixels in the area. The system may then retrieve a threshold density and/or threshold value. The system may then compare the threshold density and/or value to the determined density and/or value. If the threshold density and/or value equals or exceed the determined density and/or value, the system may determine that the area is not safe (e.g., an object is located in that direction). If the threshold density and/or value does not equal or exceed the determined density and/or value, the system may determine that the area is safe (e.g., no object and/or no moving objects are located in that direction).

In some embodiments, the system may additionally or alternatively generate a delta image based on two periphery images to determine a safe area. For example, the system may determine whether or not a particular object and/or portion of a delta image should be isolated based on the comparison of the two periphery images. For example, the system may determine a pixel density and/or pixel values of a portion of a delta image based on the two periphery images. For example, a high density of the pixels (and/or a high chromatic pixel value in one or more pixels) in the portion in delta image of the two periphery images may indicate a significant amount of change (e.g., a non-safe and/or dangerous area) in that portion of the periphery image. In contrast, a low density of pixels, represents a low amount of change. By generating a delta image using two periphery images (e.g., which may have a lower resolution), only delta information (e.g., pixel values and/or pixel density) having a particular threshold is required to be processed, increasing the processing speed of the system.

In some embodiments, as discussed in FIG. 6 above, the system may identify the known object based on the output. The system may then retrieve a size of the known object and map a terrain of the second vehicular scenario based on the size and distance of the known object.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 3-4 could be used to perform one or more of the steps in FIG. 7.

Figure 8:
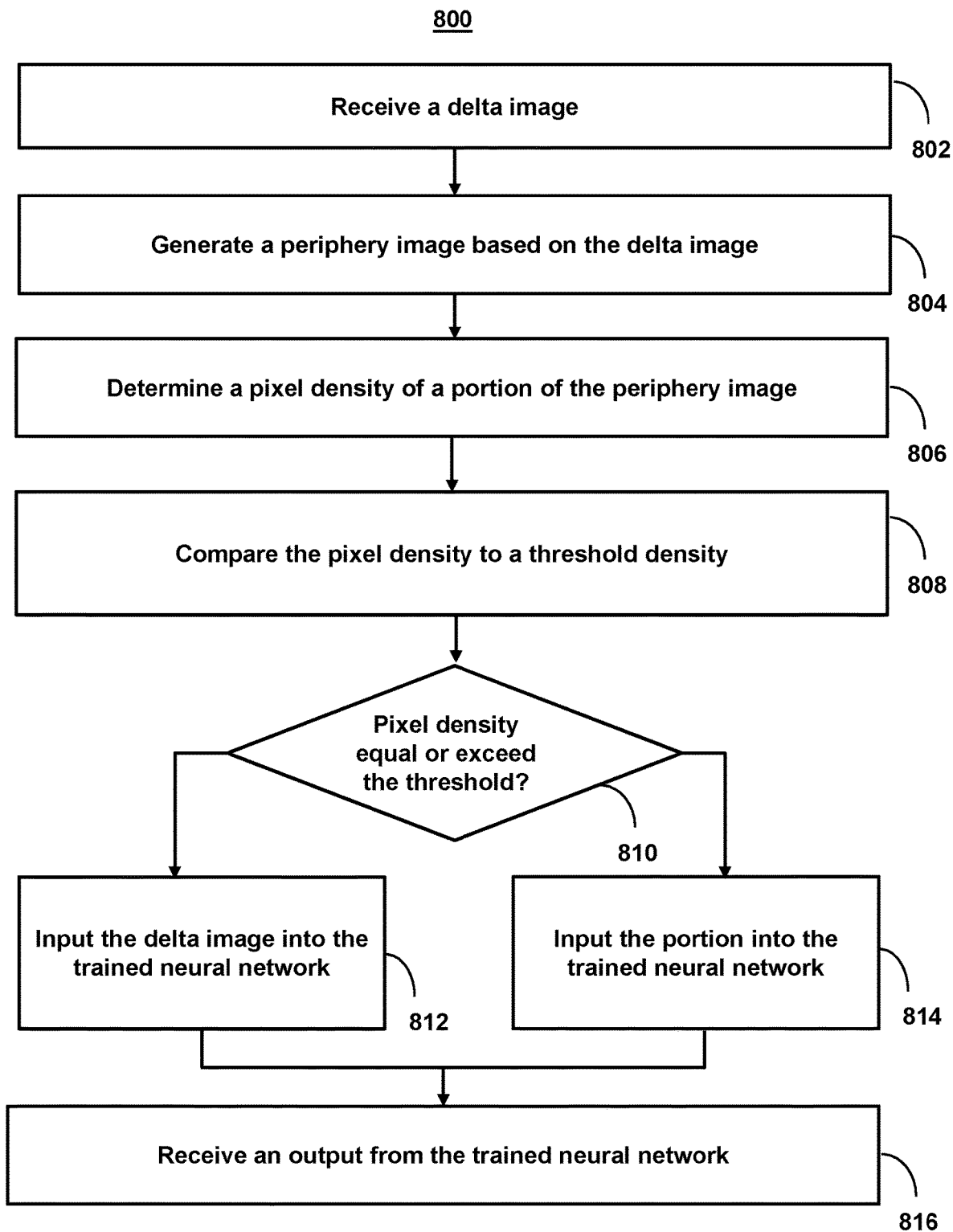
FIG. 8 shows a flowchart for identifying portions of a delta image for submitting to an artificial neural network, in accordance with one or more embodiments.

FIG. 8 shows a flowchart for identifying portions of a delta image for submitting to an artificial neural network, in accordance with one or more embodiments. Process 800 may be performed using the control circuitry of one or more components described in FIG. 3.

At step 802, process 800 receives (e.g., using the control circuitry of one or more components described in FIG. 3) a delta image. For example, the system may capture a delta image while an autonomous or semi-autonomous vehicle is in operation. The pixels of the delta image may each have a respective coordinate, which indicates the position of the pixel in the delta image.

At step 804, process 800 generates (e.g., using the control circuitry of one or more components described in FIG. 3) a periphery image based on the delta image. For example, the system may generate the periphery image for a corresponding delta image based on removing chromatic information and/or reduce its size (e.g., from 1920×1080 pixels to 20×11 pixels). The pixels of the periphery image may each have a respective coordinate, which indicates the position of the pixel in the periphery image.

At step 806, process 800 determines (e.g., using the control circuitry of one or more components described in FIG. 3) a pixel density of a portion of the periphery image. For example, a high density of the pixels in the periphery image indicates a significant amount of change in that portion of the periphery image. In contrast, a low density of pixels, represents a low amount of change. In some embodiments, the system may additionally or alternatively determine one or more values (e.g., a chromatic value associated with the pixel) of one or more pixels in the portion. The system may then retrieve a threshold density and/or threshold value. For example, the system may determine a portion of the periphery and/or delta image based on a set of pixel coordinates that indicates a boundary of the portion in the periphery and/or delta image.

At step 808, process 800 compares (e.g., using the control circuitry of one or more components described in FIG. 3) the pixel density to a threshold density. For example, the system may compare the pixel density in a region to a threshold density. Densities below the threshold may be ignored (e.g., as not enough movement occurred in that region).

At step 810, process 800 determines (e.g., using the control circuitry of one or more components described in FIG. 3) whether or not the pixel density equals or exceed the threshold. If process 800 determines that the pixel density equals or exceeds the threshold, process 800 proceeds to step 814. At step 814, process 800 inputs the portion into the trained neural network. If process 800 determines that the pixel density does not equal or exceed the threshold, process 800 proceeds to step 812. In some embodiments, the system may then compare a value of one or more pixels (e.g., a chromatic value associated with the pixel) to a threshold value. If the threshold value equals or exceed the determined value, the system may input the portion into the trained neural network. If the threshold value does not equal or exceed the determined value, the system may not input the portion into the trained neural network and/or may input the entire image.

At step 812, process 800 inputs the delta image into the trained neural network. For example, if a given portion of the delta image does not meet the pixel density, process 800 may ignore that portion (i.e., that portion is not processed). Alternatively, if the portion does not meet the threshold, the system may process the entire delta image (e.g., as opposed to only the portion).

At step 816, process 800 receives (e.g., using the control circuitry of one or more components described in FIG. 3) an output from the trained neural network. For example, the output may indicate that the known object is in the second delta image.

In some embodiments, the system may additionally or alternatively generate a delta image based on two periphery images. For example, the system may determine whether or not a particular object and/or portion of a delta image should be isolated based on the comparison of the two periphery images. For example, similar to step 806 above, the system may determine (e.g., using the control circuitry of one or more components described in FIG. 3) a pixel density and/or pixel values of a portion of a delta image based on the two periphery images. For example, a high density of the pixels (and/or a high chromatic pixel value in one or more pixels) in the portion in delta image of the two periphery images may indicate a significant amount of change in that portion of the periphery image. In contrast, a low density of pixels, represents a low amount of change. By generating a delta image using two periphery images (e.g., which may have a lower resolution), only delta information (e.g., pixel values and/or pixel density) having a particular threshold is required to be processed, increasing the speed of the system. If the threshold value equals or exceed the determined value, the system may input the portion into the trained neural network (e.g., as discussed at step 814). If the threshold value does not equal or exceed the determined value, the system may not input the portion (or input the entire delta image including the portion) into the trained neural network and/or may input the entire image.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 3-4 could be used to perform one or more of the steps in FIG. 8.

Figure 9:
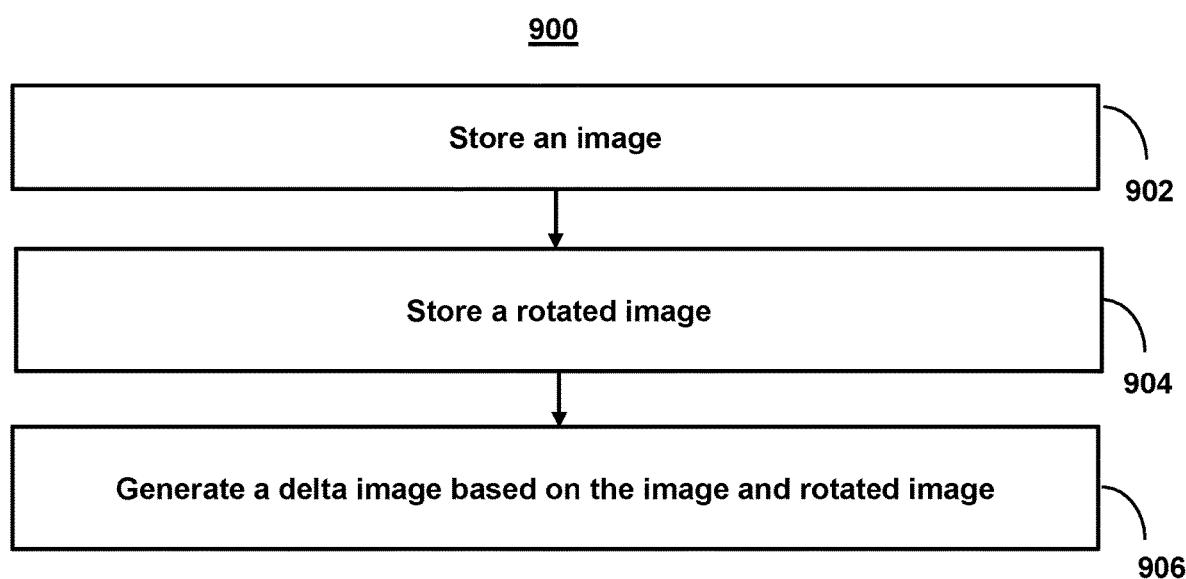
FIG. 9 shows a flowchart for generating delta images, in accordance with one or more embodiments.

FIG. 9 shows a flowchart for generating delta images, in accordance with one or more embodiments. In some embodiments, process 900 may be used to populate training data for the artificial neural network. For example, process 900 may be used to create delta image of known objects that may be labeled and used to train the artificial neural network. Alternatively or additionally, process 900 may be used to generate delta images of stationary objects. For example, during the operation of an autonomous or semi-autonomous vehicle, process 900 may identify objects in vehicular scenarios.

At step 902, process 900 stores (e.g., using the control circuitry of one or more components described in FIG. 3) an image. For example, if process 900 is being used to populate a training data set, process 900 may capture an image of a known object. Alternatively, if process 900 is being used to identify an object during operation of an autonomous or semi-autonomous vehicle, process 900 may capture an image of an unknown object.

At step 904, process 900 stores (e.g., using the control circuitry of one or more components described in FIG. 3) a rotated image. For example, if process 900 is being used to populate a training data set, process 900 may capture a rotated image of a known object. By rotating a camera and/or image during training, process 900 creates a delta image that can be labeled and used to train the artificial neural network. Alternatively, if process 900 is being used to identify an object during operation of an autonomous or semi-autonomous vehicle, process 900 may rotate a camera (e.g., video camera 106 (FIG. 1)) and capture a rotated image of an unknown object. For example, a single frame-difference from a stationary camera cannot resolve whether a traffic light has changed from red to green, or from green to red (e.g., both the green light and red light would be changed—one on and one off). The system may therefore rotate its camera to generate a delta image of the traffic light. For example, a single frame tilt produces a delta frame in which a current light (e.g., green or red) is indicated. In some embodiments, the system may rotate an image (or camera) by one or more degrees (e.g., 2-3). Alternatively or additionally, the system may offset the images by one or more pixels (e.g., 2-3 pixels) in one or both axes.

In some embodiments, the system may determine to retake a current image. For example, in response to detecting that ego-motion is zero, the system may capture an image of an object and/or vehicular scenario. For example, a delta image criterion may indicate that if current ego-motion is zero (e.g., corresponding to a vehicle stopped at a stoplight), the system may determine to vary the rate at which frames are captured. For example, the system may determine to increase its frame rate. The system may alternatively or additionally determine to capture a subsequent image (e.g., for use in generating a delta image) by rotating the previously captured image and/or my rotating a camera used to capture images and capture a rotated image of the object and/or vehicular scenario. The rotated image may then be user to generate a supplemental delta image. For example, the delta image based on the rotated image may be used to identify objects having a varying visual characteristic (e.g., a streetlight changing from red to green).

In another example, in response to failing to identify an object in a scenario, the system may determine to vary the rate at which frames are captured. For example, the system may determine to increase its frame rate if an object it not identified based on a delta image. The system may capture an additional image (e.g., of an object and/or vehicular scenario). The system may then generate a delta image for the object by capturing another image, creating another image by rotating the previously captured image, and/or by rotating a camera used to capture images and capture a rotated image of the object and/or vehicular scenario to generate a supplemental delta image.

At step 906, process 900 generates (e.g., using the control circuitry of one or more components described in FIG. 3) a delta image based on the image and rotated image. For example, if process 900 is being used to populate a training data set, process 900 may compare the images to create a labeled delta image. Alternatively, if process 900 is being used to identify an object during operation of an autonomous or semi-autonomous vehicle, process 900 may compare the images to create a delta image that may then be submitted to a trained artificial neural network to identify an object in the delta image.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 3-4 could be used to perform one or more of the steps in FIG. 9.

Figure 10:
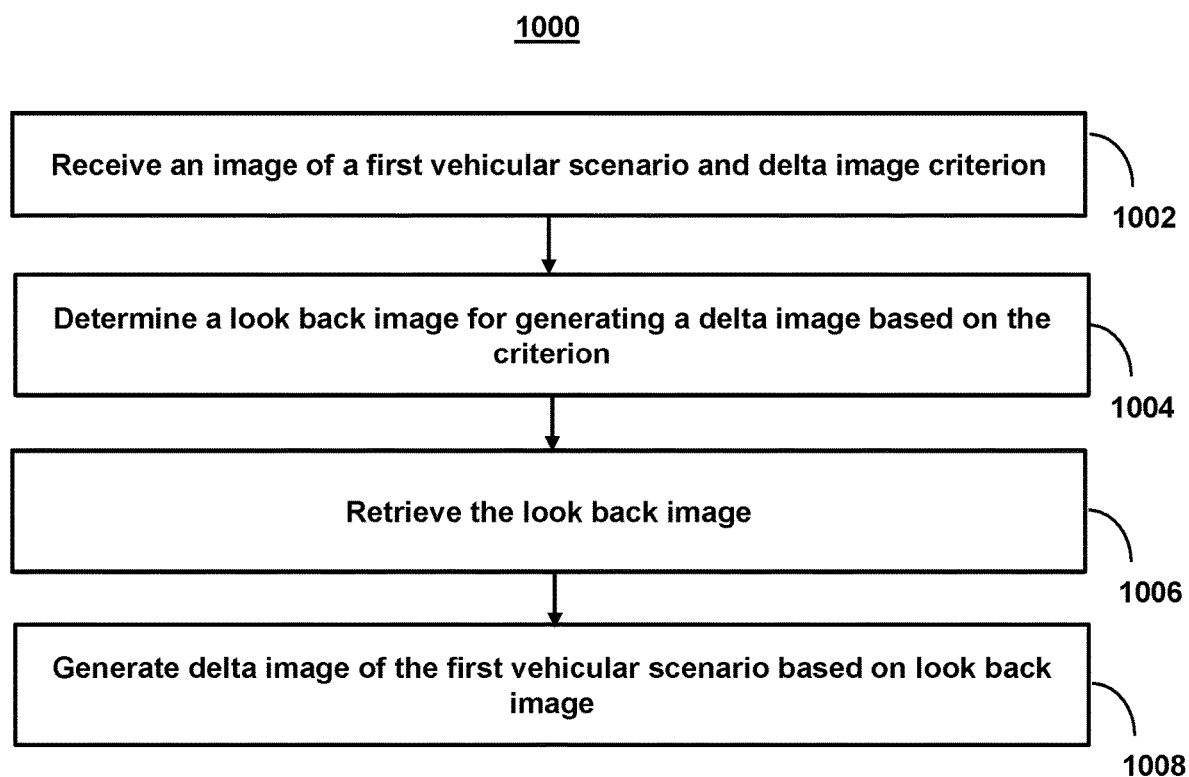
FIG. 10 shows a flowchart for generating a delta image based on a look back image, in accordance with one or more embodiments.

FIG. 10 shows a flowchart for generating a delta image based on a look back image, in accordance with one or more embodiments. Process 1000 may be performed using the control circuitry of one or more components described in FIG. 3.

At step 1002, process 1000 receives (e.g., using the control circuitry of one or more components described in FIG. 3) an image of a vehicular scenario and delta image criterion. In some embodiments, the delta image criterion may include a recommended number of look back images, a recommended temporal gap between look back images, or an assigned significance of look back images. In some embodiments, the delta image criterion is based a determined ego motion, a determined lighting, or a determined environmental factor.

At step 1004, process 1000 determines (e.g., using the control circuitry of one or more components described in FIG. 3) a look back image for generating a delta image based on the criterion. For example, in response to a delta image criterion requiring a particular number of look back images or a particular time gap, the system may determine a look back image that matches the criterion.

At step 1006, process 1000 retrieves (e.g., using the control circuitry of one or more components described in FIG. 3) the look back image. For example, one or more look back images may be stored in memory for later retrieval. For example, using a look back image, the system may determine a direction, speed, and/or estimate a future location on an object.

At step 1008, process 1000 generates (e.g., using the control circuitry of one or more components described in FIG. 3) a delta image of a vehicular scenario based on the look back image. For example, as discussed in FIG. 5, the system may determine a first thickness of a delta edge of the known object in the second delta image. The system may then receive a third delta image of the second vehicular scenario and determine a second thickness of a delta edge of the known object in a third delta image. The system may then compare the first thickness and the second thickness and determine an acceleration or deceleration of the known object based on the comparison.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 3-4 could be used to perform one or more of the steps in FIG. 10.

Although the present invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment. Moreover, other applications, beyond control systems for autonomous and semi-autonomous vehicles are contemplated. For example, the delta-vision techniques discussed herein are equally applicable to night-vision and security applications. That is, the delta-vision techniques discussed herein may be application to any application in which object may need to be identified.

The present techniques will be better understood with reference to the following enumerated embodiments:

1. A method of identifying objects while operating autonomous or semi-autonomous vehicles, the method comprising: receiving, using the control circuitry, a first delta image of a first vehicular scenario; labeling, using the control circuitry, the first delta image with a known object in the first vehicular scenario; training, using the control circuitry, artificial neural network to detect the known object in the first vehicular scenario based on the first delta image; receiving, using the control circuitry, a second delta image of a second vehicular scenario; inputting, using the control circuitry, the second delta image into the trained neural network; and receiving, using the control circuitry, an output from the trained neural network indicating that the second vehicular scenario includes the known object.

2. A method of identifying objects while operating autonomous or semi-autonomous vehicles, the method comprising: receiving, using the control circuitry, a first delta image of a first vehicular scenario; generating, using the control circuitry, a first pixel array based on the image of the first vehicular scenario; labeling, using the control circuitry, the first pixel array with a known object in the first vehicular scenario; training, using the control circuitry, an artificial neural network to detect the known object in the first vehicular scenario based on the labeled first pixel array; receiving, using the control circuitry, a second delta image of a second vehicular scenario; generating, using the control circuitry, a second pixel array based on the second delta image of the second vehicular scenario; inputting, using the control circuitry, the second pixel array into the trained neural network; and receiving, using the control circuitry, an output from the trained neural network indicating that the second vehicular scenario includes the known object.

3. The method of any one of embodiments 2 or 3, further comprising: storing, using a camera of an autonomous or semi-autonomous vehicle, an image of the second vehicular scenario; rotating the camera; storing, using the camera of an autonomous or semi-autonomous vehicle, a rotated image of the second vehicular scenario; and generating the second delta image based on the image and the rotated image.

4. The method of any one of embodiments 2-3, further comprising: receiving an image of the second vehicular scenario and delta image criterion; selecting a look back image based on the criterion, wherein the look back image is a previously stored image of the first vehicular scenario; retrieving the look back image; and generating the second delta image based on look back image.

5. The method of any one of embodiments 2-4, further comprising: generating a periphery image based on the second delta image by removing chromatic information from the second delta image; determining a pixel density of a portion of the periphery image; comparing the pixel density to a threshold density; and in response to the pixel density equaling or exceeding the threshold, selecting a portion of the second delta image corresponding to the portion for the basis of the second pixel array.

6. The method of any one of embodiments 2-5, further comprising: determining a dangerous condition based on the output; determining an area in the second delta image with no delta information; and directing an autonomous or semi-autonomous vehicle to the area based the second delta image having no delta information in that area.

7. The method of any one of embodiments 2-6, further comprising: determining a thickness of a delta edge of the known object in the second delta image; and determining a speed of the known object or a distance to the known object based on the thickness.

8. The method of any one of embodiments 2-7, further comprising: identifying the known object based on the output; retrieving a size of the known object; mapping a terrain of the second vehicular scenario based on the size and distance of the known object.

9. The method of any one of embodiments 2-8, further comprising: determining a first thickness of a delta edge of the known object in the second delta image; receiving a third delta image of the second vehicular scenario; determining a second thickness of a delta edge of the known object in a third delta image; comparing the first thickness and the second thickness; and determining an acceleration or deceleration of the known object based on the comparison.

10. A method of identifying objects while operating autonomous or semi-autonomous vehicles, the method comprising: receiving, using the control circuitry of an autonomous or semi-autonomous vehicle, a delta image of a vehicular scenario; generating, using the control circuitry, a pixel array based on the delta image; inputting, using the control circuitry, the pixel array into a neural network; receiving, using the control circuitry, an output from the neural network identifying an object in the pixel array; and initiating a control operation for the autonomous or semi-autonomous vehicle based on the object.

11. The method of embodiment 10, further comprising: storing an image of the object; rotating the image of the object; storing a rotated image of the object; generating a test delta image based on the image and the rotated image; labeling the test delta image with the object; and training the neural network based on the labeled test delta image.

12. The method of embodiment 10 or 11, further comprising: generating a periphery image based on the delta image by removing chromatic information from the delta image; determining a pixel density of a portion of the periphery image; comparing the pixel density to a threshold density; and in response to the pixel density equaling or exceeding the threshold, inputting the portion into the neural network.

13. A method of identifying objects during night vision applications, the method comprising: receiving a delta image of a night vision scenario; detecting delta information in the delta image; and overlaying the delta information on an image of the night vision scenario.

14. The method of embodiment 13, further comprising modifying a visual characteristic of the delta information in the overlaid image.

15. The method of embodiment 13 or 14, further comprising identifying an object or information about the object based on the delta image.

16. The method of embodiment 15, wherein the information about the object based on the delta image includes a size, distance, or depth of the object.

17. A method of compressing frame-difference images, the method comprising frame differencing an uncompressed first frame with an uncompressed second uncompressed frame; generating a frame-differenced frame based on the frame-differencing; and compressing the frame-differenced frame.

18. A tangible, non-transitory, machine-readable medium storing instructions that, when executed by a data processing apparatus, cause the data processing apparatus to perform operations comprising those of any of embodiments 1-17.

19. A system comprising: one or more processors; and memory storing instructions that, when executed by the processors, cause the processors to effectuate operations comprising those of any of embodiments 1-17.

20. A system comprising means for performing one or more of the steps of embodiments 1-17.

What is claimed is:

1. A method of identifying objects while operating autonomous or semi-autonomous vehicles, the method comprising:
receiving, using control circuitry, a first delta image of a first vehicular scenario;
generating, using the control circuitry, a first pixel array based on the image of the first vehicular scenario;
labeling, using the control circuitry, the first pixel array with a known object in the first vehicular scenario;
training, using the control circuitry, an artificial neural network to detect the known object in the first vehicular scenario based on the labeled first pixel array;
receiving, using the control circuitry, a second delta image of a second vehicular scenario;
generating, using the control circuitry, a second pixel array based on the second delta image of the second vehicular scenario;
inputting, using the control circuitry, the second pixel array into the trained neural network; and
receiving, using the control circuitry, an output from the trained neural network indicating that the second vehicular scenario includes the known object.

2. The method of claim 1, further comprising:
storing, using a camera of an autonomous or semi-autonomous vehicle, an image of the second vehicular scenario;
rotating the camera;
storing, using the camera of an autonomous or semi-autonomous vehicle, a rotated image of the second vehicular scenario; and
generating the second delta image based on the image and the rotated image.

3. The method of claim 1, further comprising:
receiving an image of the second vehicular scenario and delta image criterion;
selecting a look back image based on the criterion, wherein the look back image is a previously stored image of the first vehicular scenario;
retrieving the look back image; and
generating the second delta image based on the look back image.

4. The method of claim 1, further comprising:
generating a periphery image based on the second delta image by removing chromatic information from the second delta image;
determining a pixel density of a portion of the periphery image;
comparing the pixel density to a threshold density; and
in response to the pixel density equaling or exceeding the threshold, selecting a portion of the second delta image corresponding to the portion for generating the second pixel array.

5. The method of claim 1, further comprising:
determining a dangerous condition based on the output;
determining an area in the second delta image with no delta information; and
directing an autonomous or semi-autonomous vehicle to the area based the second delta image having no delta information in that area.

6. The method of claim 1, further comprising:
determining a thickness of a delta edge of the known object in the second delta image; and
determining a speed of the known object or a distance to the known object based on the thickness.

7. The method of claim 1, further comprising:
identifying the known object based on the output;
retrieving a size of the known object;
mapping a terrain of the second vehicular scenario based on the size and distance of the known object.

8. The method of claim 1, further comprising:
determining a first thickness of a delta edge of the known object in the second delta image;
receiving a third delta image of the second vehicular scenario;
determining a second thickness of a delta edge of the known object in a third delta image;
comparing the first thickness and the second thickness; and
determining an acceleration or deceleration of the known object based on the comparison.

9. A system for identifying objects while operating autonomous or semi-autonomous vehicles, the system comprising:
memory configured to store an artificial neural network; and
control circuitry configured to:

receive a first delta image of a first vehicular scenario;

generate a first pixel array based on the image of the first vehicular scenario;

label the first pixel array with a known object in the first vehicular scenario;

train artificial neural network to detect the known object in the first vehicular scenario based on the labeled first pixel array;

receive a second delta image of a second vehicular scenario;

generate a second pixel array based on the second delta image of the second vehicular scenario;

input the second pixel array into the trained neural network; and receive an output from the trained neural network indicating that the second vehicular scenario includes the known object.

10. The system of claim 9, wherein the control circuitry is further configured to:

store, using a camera of an autonomous or semi-autonomous vehicle, an image of the second vehicular scenario;

rotate the camera;

store, using the camera of an autonomous or semi-autonomous vehicle, a rotated image of the second vehicular scenario;

generate the second delta image based on the image and the rotated image.

11. The system of claim 9, wherein the control circuitry is further configured to:

receive an image of the second vehicular scenario and delta image criterion;

select a look back image based on the criterion, wherein the look back image is a previously stored image of the first vehicular scenario retrieve the look back image; and generate the second delta image based on the look back image.

12. The system of claim 9, wherein the control circuitry is further configured to:

generate a periphery image based on the second delta image by removing chromatic information from the second delta image;

determine a pixel density of a portion of the periphery image;

compare the pixel density to a threshold density; and select a portion of the second delta image corresponding to the portion for generating the second pixel array in response to the pixel density equaling or exceeding the threshold.

13. The system of claim 9, wherein the control circuitry is further configured to:

determine a dangerous condition based on the output;

determine an area in the second delta image with no delta information; and direct an autonomous or semi-autonomous vehicle to the area based the second delta image having no delta information in that area.

14. The system of claim 9, wherein the control circuitry is further configured to:

determine a thickness of a delta edge of the known object in the second delta image; and determine a speed of the known object or a distance to the known object based on the thickness.

15. The system of claim 9, wherein the control circuitry is further configured to:

identify the known object based on the output;

retrieve a size of the known object;

map a terrain of the second vehicular scenario based on the size and distance of the known object.

16. The system of claim 9, wherein the control circuitry is further configured to:

determine a first thickness of a delta edge of the known object in the second delta image;

receive a third delta image of the second vehicular scenario;

determine a second thickness of a delta edge of the known object in a third delta image;

compare the first thickness and the second thickness; and determine an acceleration or deceleration of the known object based on the comparison.

17. A method of identifying objects while operating autonomous or semi-autonomous vehicles, the method comprising:

receiving, using control circuitry of an autonomous or semi-autonomous vehicle, a delta image of a vehicular scenario;

generating, using the control circuitry, a pixel array based on the delta image;

inputting, using the control circuitry, the pixel array into a neural network;

receiving, using the control circuitry, an output from the neural network identifying an object in the pixel array; and initiating a control operation for the autonomous or semi-autonomous vehicle based on the object.

18. The method of claim 17, further comprising:

storing an image of the object;

rotating the image of the object;

storing a rotated image of the object;

generating a test delta image based on the image and the rotated image;

labeling the test delta image with the object; and training the neural network based on the labeled test delta image.

19. The method of claim 17, further comprising:

generating a periphery image based on the delta image by removing chromatic information from the delta image;

determining a pixel density of a portion of the periphery image;

comparing the pixel density to a threshold density; and in response to the pixel density equaling or exceeding the threshold, inputting the portion into the neural network.

20. The method of claim 17, further comprising:

receiving an image of the vehicular scenario and delta image criterion;

selecting a look back image based on the criterion, wherein the look back image is a previously stored image of the vehicular scenario;

retrieving the look back image; and generating the delta image based on the look back image.

21. The method of claim 17, wherein the control operation comprises:

determining a thickness of a delta edge of the object in the delta image; and determining a distance to the object based on the thickness.

* * * * *